INVENTOR.
Rudi Wetzel
Dieter Schenk
BY Percy P. Lantzy
Attorney

INVENTOR.
Rudi Wetzel
Dieter Schenk
BY
Attorney

INVENTOR.
Rudi Wetzel
Dieter Schenk
BY
Percy P. Lantzy
Attorney

United States Patent Office 3,121,139 Patented Feb. 11, 1964

3,121,139
SYNCHRONIZING DEVICE FOR START-STOP PRINTING TELEGRAPH RECEIVERS

Rudi Wetzel and Dieter Schenk, Pforzheim, Germany, assignors to International Standard Electric Corporation, New York, N.Y., a corporation of Delaware Filed Nov. 1, 1961, Ser. No. 149,409
Claims priority, application Germany Nov. 24, 1960
8 Claims. (Cl. 178—53.1)

This invention relates to a mechanical synchronizing device for motor-driven printing telegraph receivers operating according to the start-stop principle, which is adapted to automatically replace synchronizing elements falsified or mutilated on the transmission path, for example, by noise influences.

According to the peculiarity of the start-stop teleprinting system, for synchronizing the local transmitter and the distant receiver, each train of signal pulses is preceded by a no-current pulse as the start element adapted to start both motors synchronously and is followed by a current pulse as the stop element adapted to effect the stoppage of both motors until the arrival of the next successive starting pulse. Under normal conditions of transmission and by requiring a relatively low technical expenditure, this system ensures a sufficiently reliable synchronizing operation between the individual subscribers.

The situation, however, becomes critical as soon as synchronizing pulses are falsified or mutilated by the noise influence on the transmission path, which is likely to appear on long lines or especially in the case of radio transmission, so that the synchronization for several characters is disturbed.

This susceptibility to interferences has a particularly disadvantageous effect when transmitting coded messages, because in this case the employed encoding devices at the transmitting and receiving ends are generally synchronized by the outgoing or incoming signals. If, in the course of this synchronizing effect, and because of a disturbance of transmission, one signal is lost, then this will cause a disturbance in the synchronization of the coding devices at the stations corresponding with one another, and which, of course, entails the fact that the entire following message can no longer be correctly decoded.

Also in a normal plain text operation, and in the case of poor-quality transmission paths, it may happen that because of disturbed synchronizing signals, the text is already partly reproduced in a mutilated form to such an extent that the receiving apparatus can only guess the actual meaning of the respective word from the context, this having an extremely disadvantageous effect, especially when transmitting short messages, such as telegrams.

For this reason proposals have already been made which, with the aid of special electronic or electromechanical devices and attachments, try to eliminate this disadvantage of the start-stop system.

Thus, electronically operating synchronizing attachments especially for the coding or ciphering operation are already known, which, by requiring a relatively high expenditure at the receiving end, supervise the succession of signals and electronically replace any possibly missing synchronizing elements. The advantage of these arrangements resides substantially in the almost inertialess way of operation, so that twelve and more successively following faulty signals can be simulated without disturbing the synchronization. The disadvantage of these arrangements resides in the high initial costs, in the requirement of a separate source of current, in the requirement for inserting into the line circuit, and in the relatively large volume of the apparatus which practically does not permit its installation into a teleprinter or coding apparatus (ciphering apparatus).

Furthermore, teleprinter attachments have already become known which, in an electromechanical manner, are supposed to take care of the re-insertion of synchronizing elements that have been lost during the operation. Thus, for example, in the German Patent No. 884,506, an arrangement for the transmission of telegraph signals over strongly disturbed transmission paths is proposed in which, under the condition of a rhythmical performance of the transmission and with the aid of motor-driven transmitters, a time-tapper device is provided at the receiving end which, with respect to frequency and phase, is regulated by the incoming signals, and provides the start pulses for the actual receiving apparatus. Only the further current elements are then utilized in the conventional manner for the setting or printing of the transmitted character. This arrangement, however, has the considerable disadvantage that it is subjected to a considerable wear because of permanent stress, and in the case of a missing stop element which is not being replaced, is compelled to fall out of step due to a one and a half times longer pulse duration thereof, because in this case the receiving apparatus would continue to operate and, consequently, at the beginning of the next character, would cause a time delay of thirty milliseconds which could also not be corrected by the time-tapper equipment.

A further arrangement disclosed in the German Patent No. 963,785, provides a regeneration at the receiving end of faulty or strongly distorted start and stop elements. This is accomplished via a switching drum which is positively coupled to the receiving shaft at the proper time position and causes two pairs of contact springs, arranged in the internally supplied line circuit of the receiving magnet controlled via a polarized relay, to be operated in such a way that their switching condition during the start or stop element is fundamentally superimposed on those of the polarized relay, and thus correct any distortions or mutilations of these elements appearing on the transmission path.

This arrangement, above all, has the disadvantage that an internal source of current has to be provided merely for the regeneration of the current-stop element, this source being normally not required, especially not required in the case of wire-bound transmission paths, and, in connection with the consequently required polarized relays, representing a considerable additional expenditure. In addition thereto a careful encapsulation of the contacts is required in order to provide a protection against an otherwise unavoidable soiling which is due to the oil, dust, etc., developed by the machine itself. Moreover, the subsequent installation into series-manufactured machines may be accompanied by some difficulties due to the considerable mechanical and electrical arrangement. By providing additional electrical means this arrangement may be operable only in the case of machine transmissions. Because of this, a regeneration of the start and stop elements only appears after about nine seconds, which time corresponds to the time required for the printing of one line of the page-printer, so that under certain circumstances, the message contained therein is strongly mutilated, which may have an extremely undesirable effect, especially in the case of short messages.

All of the above mentioned disadvantages are avoided by the present invention providing a purely mechanical synchronizing arrangement which is featured by the fact that a camplate is separately driven and released by the movement of the receiving cam-sleeve, at the beginning of the stop element, as well as at the beginning of the start element, and acts in such a way either directly upon the armature or indirectly upon one of its transfer members, e.g. upon the locking pawl, that the armature or the respective transfer member is moved into the proper position in the case of a failure of the respective synchronizing pulse.

In the following the invention will now be explained in detail with reference to the accompanying drawings, in which.

Figure 1:
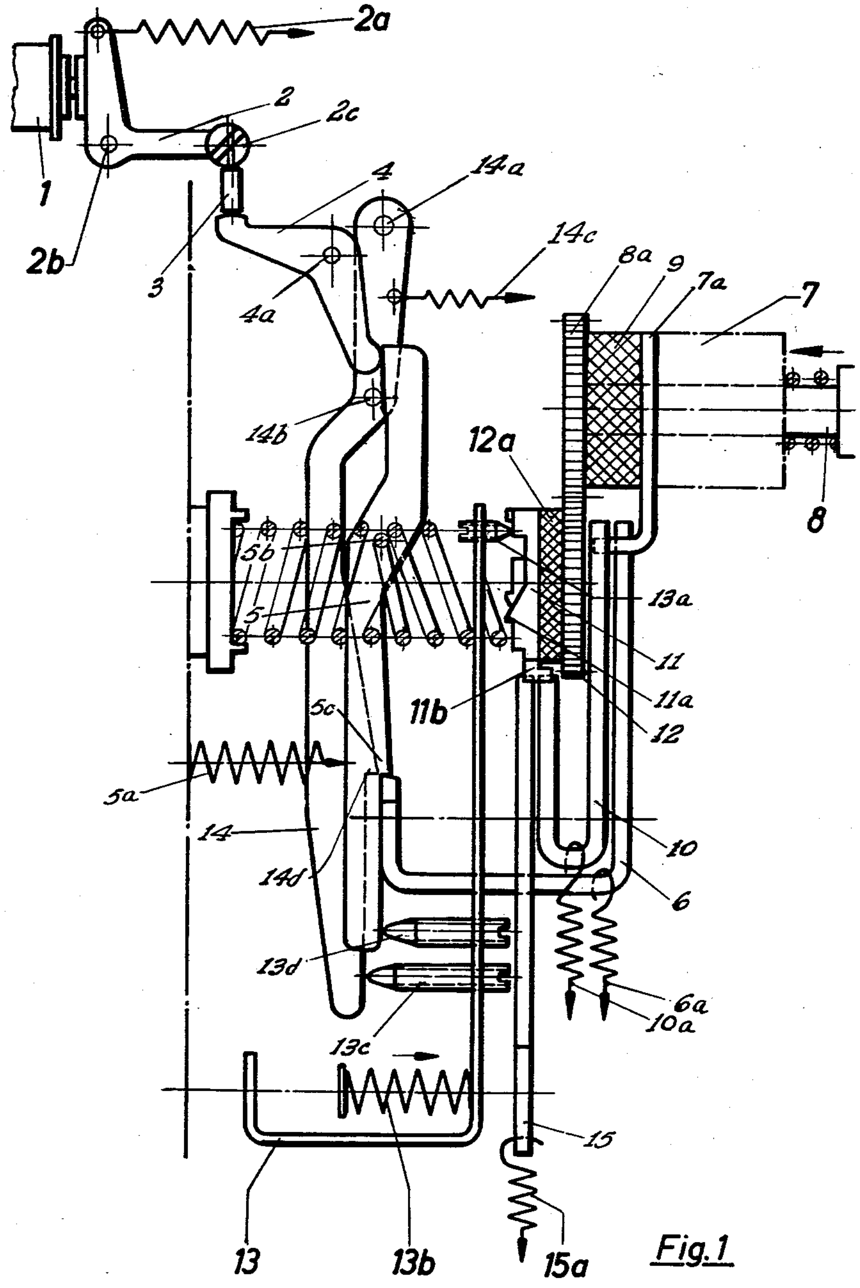
FIG. 1 is a side view of the synchronizing arrangement according to the invention.

The components indicated by the reference characters 1–9 of the arrangements shown in the accompanying drawings and which, for the sake of clarity, are shown in a spread-out form, represent parts of a normal selecting system according to the start-stop principle. In the conventional manner this system operates in such a way that the receiving magnet 1, which is energized in the normal condition via the line current lead, is de-energized on account of the no-current start pulse preceding each teleprinter character, so that the armature 2 of the magnet 1 which is pivoted at its center of rotation 2*b*, is detracted by the action of the armature-separating spring 2*a*. This movement is transferred via the adjusting screw 2*c* and the pin 3 to the pawl 4 which is pivoted at its center of rotation 4*a*, and which is thus turned in an anticlockwise direction in order to turn the stop pawl 5 which is pivoted at its center of rotation 5*b* in opposition to the action of its spring 5*a*, so that the stop lever 6 is disengaged from the projection 5*c* of the stop pawl. According to the showing of FIG. 2, this stop lever 6 is acted upon by a spring 6*a* adapted to engage the lever above its center of rotation, and which, in the normal condition, pulls the stop lever against a limit stop. With respect to the power of the friction drive 8/9 of the receiving cam-sleeve 7, the action of spring 6*a* is a very weak one, so that the stop arm 7*a* turns the disengaged stop lever 6 in opposition to the action of its spring 6*a*, and thus releases the receiving cam-sleeve 7 to perform one rotation. During this rotation, the setting of the machine in accordance with the proper code is effected in a well-known manner, via the not-shown selecting cams of the receiving cam-sleeve 7. In a well-known manner, the subsequently following current stop pulse takes care that the stop arm 7*a*, rotating together with the receiving cam-sleeve, is re-arrested by the action of the stop lever 6. This lever, in opposition to the starting process, and via the armature 2 which is attracted in this case, and via the pin 3 and the pawl 4, is latched by the stop pawl 5 or its projection 5*c* that has been moved backwards into the normal position by the action of the spring 5*a*, so that the receiving cam-sleeve 7, which is caused to rotate by the frictional force 9, together with the receiving shaft 8, meets against a limit stop with its stop arm 7*a* and comes to a standstill.

If now, for some reason or other, it should happen that the one or the other synchronizing pulse is mutilated or falsified during a machine transmission in such a way that the machine code is effected in the wrong way, a releasing of the receiving cam-sleeve will be prevented in the case of a missing start element. The next successive no-current pulse contained in the teleprinter signal combination is thereby evaluated as a start pulse, so that the receiver is started with a time delay, thus losing the synchronism for a period of several characters. Just as important is the falsification or mutilation of a stop element, because the receiving cam-sleeve, instead of being stopped, may then continue to rotate, whereby both the transmitter and the receiver, as far as single or final characters are not concerned, fall out of step with a phase shift corresponding to the length of one stop pulse, so that as a rule several characters are completely lost before the synchronism is automatically re-established.

This source of susceptibility to interferences of printing telegraph receivers is extensively eliminated by the purely mechanical arrangement of the invention to be described hereinafter.

Figure 2:
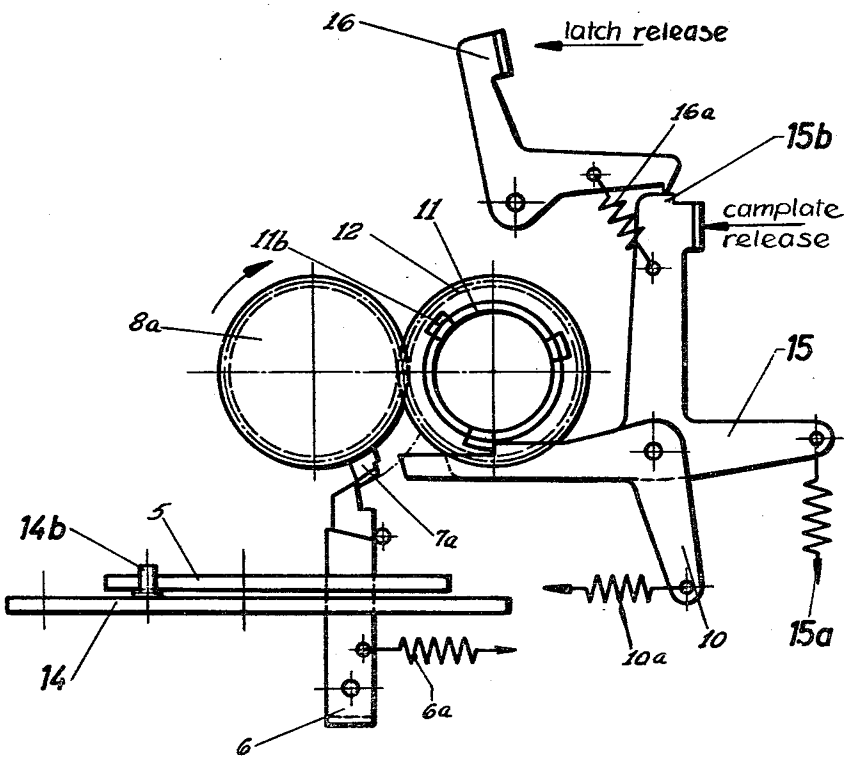
FIG. 2 is a front view of the components of FIG. 1, illustrating their cooperation, but it is not a true front view of the arrangement shown in FIG. 1.

In the solution of the problem shown in FIG. 1 a toothed wheel 8*a* is firmly arranged on the receiving shaft 8. This toothed wheel 8*a* drives another toothed wheel 12 in the ratio of 1:1, by which a camplate 11 is driven via a friction clutch 12*a*. This camplate, for example, is provided with three cams 11*b* which are staggered by 120°, and one of which is engaged by the locking pawl 10 when in the normal condition, and thus guarantees a defined initial position. The camplate 11 is provided with an equal and repeated number of cam-sections corresponding to the three cams. The locking pawl 10 is pivoted, as indicated in FIG. 2 and is urged in a clockwise direction by the spring 10*a*. It is arranged at one end in such a way as to project at a defined position into the path of rotation of the stop arm 7*a*, and, by being actuated by the latter in opposition to the action of its spring 10*a*, releases the camplate 11 in order that it might perform one third of a rotation. A transfer member 13 is embodied in such a way that a sensing pin 13*a*, carried at its end, can follow the curvature of the camplate 11 under the urging of a spring 13*b*, so that the adjustable actuating pin 13*c* and 13*d* thereof are capable of acting upon the stop pawl 5 or else upon an additional pawl 14, arranged parallel in relation to the said stop pawl 5. This additional pawl is in communication with the stop pawl 5 via a pin 14*b*. The bearing 14*a* and the spring arrangement 14*c* thereof is chosen so that in a reciprocal relation to one another either the stop pawl 5, via its projection 5*c*, latches the stop lever 6, or the additional pawl 14, via its projection 14*d*, takes over this task. On account of the fact that its spring 5*a* is stronger than the spring 14*c*, the stop pawl 5 has the priority. Via the disengaged operating pins 13*c* and 13*d*, however, both can be actuated simultaneously.

An on-off switching mechanism of the synchronizing device capable of being remotely released by suitable means or of being manually operated, as shown in FIG. 2, comprises a latching pawl 15 which, on account of its spring arrangement 15*a*, additionally latches the camplate 11 in the shown condition via one of its arms extending parallel in relation to the locking pawl 10, so that a releasing of the synchronizing mechanism is rendered impossible upon actuating the locking pawl 10. At a suitable point the latch pawl 15 is designed as a key for permitting its actuation. A swivel motion in the direction of pressure effects the release of the camplate 11 by the latch pawl 15. At the same time a ratchet 16 which is acted upon by a spring 16*a*, engages the projection 15*b* and prevents the latch pawl 15 from being moved backwards. The lever 16 is likewise designed as a key at a suitable point and is adapted to release the latch pawl 15 when actuated, so that the latch pawl 15, by the action of its spring 15*a*, rapidly returns to the shown latching position.

In the case of a connection established between two subscribers of a teleprinter network via a transmission path which is susceptible to interferences, if the synchronizing device of the receiving apparatus is switched on in the manner described hereinbefore, the synchronism is maintained with the aid of the described arrangement, in the manner as follows:

Assuming that the start pulse of the first transmitted signal combination arrives at the receiving apparatus in only a slightly disturbed form, so that the receiving cam-sleeve 7 is released in the described manner, and, during its rotation, evaluates the subsequently following signal elements. At the beginning of the subsequently following stop-pulse period, the stop arm 7*a* according to FIG. 2, rotating together with the receiving cam-sleeve 7, actuates the locking pawl 10 during its further rotation, so that the camplate 11 is permitted to perform one third of a rotation, in order to be stopped again thereafter by the locking arm 10 which has meanwhile been released again by the stop arm 7*a* and has returned to its normal position.

In order to provide the real stop pulse with a priority, the camplate 11 effecting the simulation of the stop pulse is released in such a way that between the beginnings of these two pulses a phase shift of one millisecond is effected. In this way, in the case of a sufficient available stop pulse, the mechanism producing the simulation, has no effect at all upon the machine operation. The same is also applicable to the subsequently following start pulse of the following combination.

If the stop pulse, however, is missing, or if this pulse has been mutilated by some noise influence on the transmission path and has been changed into a no-current pulse, then the armature 2 of the receiving magnet 1 in FIG. 1 is dropped and, consequently, the stop pawl 5 assumes its disengage position. But the camplate 11, which has started to rotate, moves the transfer member 13 following the cam curvature, and by means of its actuating pin 13*c*, effects the release of the additional pawl 14, so that the latter, with the aforementioned time delay, latches the stop lever 6, instead of the stop pawl 5, and, consequently, prevents a continued rotation as well as the falling-out-of-step of the receiver motor.

A similar process is performed if the start pulse of the subsequently following combination is mutilated in such a way that the armature 2 is prevented from dropping off, so that under normal conditions the receiving cam-sleeve 7 would not be released. To this end the camplate 11 is provided with a positive cam 11*a* which, at a suitable time position, controls the transfer member 13 in such a way that both pawls 5 and 14 unlatch the stop lever 6, so that the receiving cam-sleeve 7 is released to perform its rotation. Also in this case, for the purpose of maintaining the priority or preference of the stop pawl 5, the release is delayed by a period of one millisecond.

The phase shift between the transmitting and receiving apparatus caused thereby is only a slight one in the individual case, and is compensated for by each of the following real start pulses. Only after six to eight subsequently following mechanically produced start pulses does the phase shift grow to such an extent that a proper recognition of the signal pulses by the receiving mechanism becomes doubtful. Under these conditions, however, the remaining combination elements will also be distorted and disturbed to such an extent that an intelligible transmission of messages will not be achievable even in the case of an absolute synchronism, without the provision of special means.

Figure 3:
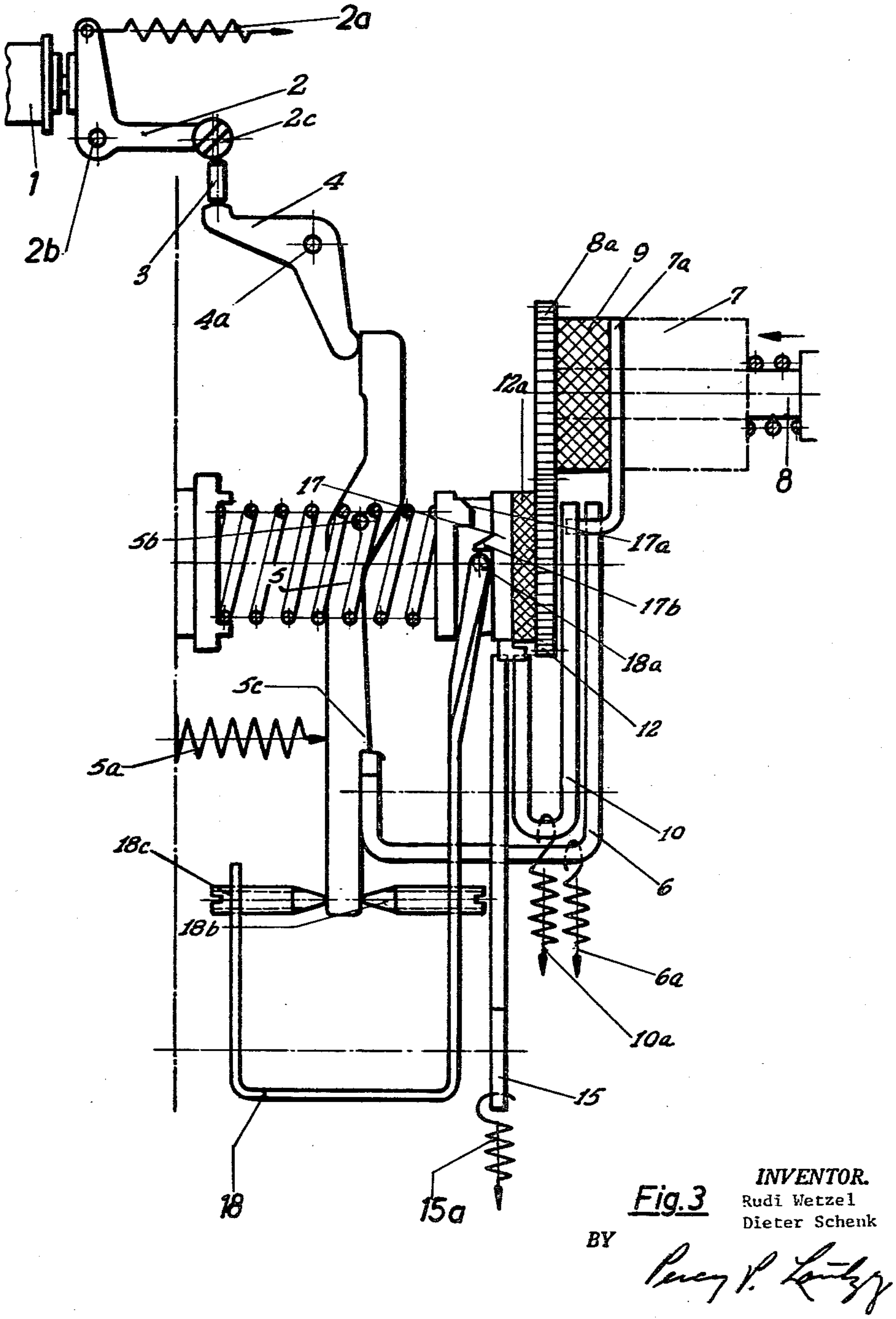
FIG. 3 is a side view of a synchronizing device illustrating another constructional solution of the problem in accordance with the invention.

FIG. 3 shows a solution of the problem, which is somewhat modified with respect to the solution shown in FIG. 1. The arrangement according to this solution operates without requiring the additional pawl 14 in FIG. 1. Instead, a partly compulsory camplate 17 is used for guiding the transfer member 18. This camplate, at the starting time position of the real stop and start pulse, provides the guide pin 18*a* on the end of the transfer member 18 with such a clearance or free motion that the stop pawl 5, which is in a form-locked connection with the transfer member 18 via the two guide pins 18*c* and 18*d*, is freely movable and capable of assuming either of its positions.

In the existence of a real stop pulse, the transfer member 18 is moved in such a way via the locking pawl 5 that the compulsory cam part of cam 17*a* is prevented from becoming effective. However, in the absence of the current stop pulse, when the stop pawl 5 does not latch the stop lever, due to the action of the armature-separating spring 2*a*, and after a time delay of one millisecond- the cam-shaped member 17*a* will become effective in the manner described hereinbefore and, via the transfer member 18, will bring the stop pawl 5 into the latching position in opposition to the action of the armature-separating spring 2*a*, thus preventing a continuous rotation of the receiving cam-sleeve 7. In the same way, in the absence of the start pulse of the subsequently following teleprinter-signal combination, the projection 17*b* of the camplate 17 will effect the releasing of the stop arm 6 by means of the projection 5*c* of the stop pawl 5 with a time delay of one millisecond via the transfer member 18.

While we have described above the principles of our invention in connection with specific apparatus, it is to be clearly understood that this description is made only by way of example and not as a limitation to the scope of our invention, as set forth in the objects thereof and in the accompanying claims.

We claim:

1. A synchronizing arrangement for a start-stop telegraph system comprising means for defining character-timing intervals, continuously cycling means loosely coupled to said interval defining means, stop means for arresting said interval defining means at a predetermined point in its cycle of joint operation with said continuously cycling means, signal responsive means for releasing said stop means momentarily in response to a signal to permit said interval defining means to time one complete character interval, and means loosely coupled to said continuously cycling means, and operated by said interval defining means for exerting additional control causing said arrest means to stop said interval defining means at said predetermined point at the end of its cycle if said signal responsive means is erroneously operating to release said stop means in response to a faulty signal received at that time.

2. A synchronizing arrangement, as defined in claim 1, further comprising means operated by said additional control exerting means for causing the stop means to release said interval defining means if the signal responsive means fails to operate because of a faulty signal at a time corresponding to the start of a next successive cycle of said interval defining means.

3. A synchronizing arrangement, as defined in claim 2, in which the interval defining means is a rotatable mechanical member, the stop means is a lever pivotally mounted adjacent said member and having one end adapted to be engaged by a portion of said member to stop said member, and the additional control exerting means is a camplate with a cam follower adapted to control the movement of said lever.

4. A synchronizing arrangement, as defined in claim 3, in which the additional control exerting means comprises means for delaying the action thereof until after said interval defining means would have been stopped or released by receipt of a correct signal.

5. A synchronizing arrangement for a start-stop telegraph system comprising mechanical cycling means for defining character-timing intervals, driving means for normally causing said cycling means to cycle continuously, a stop lever pivotally mounted with respect to said cycling means so that a portion of said lever can engage a portion of said cycling means and stop the cycling thereof when said cycling means is at a predetermined point in its cycle, means normally urging said lever into its stop position, a stop pawl pivotally mounted with respect to said stop lever, spring means adapted to urge said pawl into holding relation with said stop lever to maintain said stop lever in its stop position, means responsive to a start signal for moving said stop pawl against the action of said spring means to release said stop lever and permit said cycling means to start a cycle and responsive to a stop signal for permitting said spring means to move said stop pawl into holding relation with said stop lever again, whereby said cycling means will be stopped at the end of its cycle, and mechanical control means operated by said cycling means for releasing said stop lever or moving it to stop position if said signal responsive means fails to respond to a start signal or a stop signal.

6. A synchronizing arrangement, as defined in claim 5, in which the mechanical control means comprises a camplate, means for normally rotating said camplate, releasable holding means for holding said camplate against rotation, means for mounting said holding means in relation to the cycling means so that a portion of said cycling means can release said holding means near the end of a complete cycle of said cycling means, and cam follower means operatively controlled by said camplate for controlling the stop lever.

7. A synchronizing arrangement, as defined in claim 6, in which the camplate is so designed that the control of the stop lever by the cam follower means occurs at a time slightly later than the time at which said lever would have been controlled by the receipt of a stop or start signal.

8. A synchronizing arrangement for a start-stop telegraph system comprising:

a mechanical output control member for defining character timing intervals;

a continuously cycling member loosely coupled to said control member;

stop means operative into and out of an engaging position in accordance with signal impulses;

means normally cooperative with said stop means in the said engaging position thereof for arresting said control member at a predetermined position of said control member in a complete joint cycling of said loosely coupled control and cycling members, and normally cooperative with said stop means for subsequently releasing said arrested control member for further joint cycling with said cycling member, upon operation of said stop means out of said engaging position at the start of a signal character interval;

an auxiliary control member loosely coupled to said cycling means and controlled by said output control member, said auxiliary member being arranged to undergo a fraction of a cycle of joint operation with said cycling member commencing at a predetermined phase of the joint operation of said output control and cycling members preceding the passage of said output control member through said predetermined position; and means operated by said auxiliary control member for exerting additional control on said arresting means, said additional control being effective only in the absence of said normal cooperation between said normally cooperative means and said stop means.

References Cited in the file of this patent

UNITED STATES PATENTS 2,478,922 Hitchcock ______________ Aug. 16, 1949

FOREIGN PATENTS 213,957 Australia ______________ Mar. 20, 1958